(12) United States Patent
Hirsch (10) Patent No.: US 12,104,858 B2
(45) Date of Patent: Oct. 1, 2024

(54) CHANNEL HEAT EXCHANGER

(71) Applicant: ZEHNDER GROUP INTERNATIONAL AG, Gränichen (CH)

(72) Inventor: Christian Hirsch, Eibenstock (DE)

(73) Assignee: ZEHNDER GROUP INTERNATIONAL AG, Gränichen (CH)

( * ) Notice: Subject to any disclaimer, the term of this patent is extended or adjusted under 35 U.S.C. 154(b) by 63 days.

(21) Appl. No.: 18/021,702

(22) PCT Filed: Sep. 29, 2021

(86) PCT No.: PCT/EP2021/076865
§ 371 (c)(1),
(2) Date: Feb. 16, 2023

(87) PCT Pub. No.: WO2022/069587
PCT Pub. Date: Apr. 7, 2022

(65) Prior Publication Data
US 2023/0304742 A1 Sep. 28, 2023

(30) Foreign Application Priority Data

Sep. 30, 2020 (CH) .................................... 01244/20

(51) Int. Cl.
*F28D 7/00* (2006.01)
*F28F 7/00* (2006.01)

(52) U.S. Cl.
CPC .............. *F28D 7/0025* (2013.01); *F28F 7/00* (2013.01); *F28F 2210/08* (2013.01)

(58) Field of Classification Search
CPC ....... F28D 7/0025; F28F 7/00; F28F 2210/08; F28F 7/02
(Continued)

(56) References Cited

U.S. PATENT DOCUMENTS 5,725,051 A * 3/1998 Veltkamp .................. F28F 9/02
165/165
8,851,156 B2 * 10/2014 Semmes ............... F28F 19/006
165/165

(Continued)

FOREIGN PATENT DOCUMENTS

EP 0 720 720 B1 1/1998
EP 0 666 973 B1 2/1998
(Continued)

OTHER PUBLICATIONS

EPO (Riswijk, NL), English language version of the International Search Report, Form PCT/ISA/210, for International Application PCT/EP2021/076865, Jan. 18, 2022 (5 pages).
(Continued)

*Primary Examiner* — Jon T. Schermerhorn, Jr.
(74) *Attorney, Agent, or Firm* — Pauley Erickson & Swanson (57) ABSTRACT

A heat exchanger includes first flow ducts and adjacent second flow ducts for exchanging heat energy between first flows through the first flow ducts and second flows through the second flow ducts. A parallel flow region where flow passages and directions of the first flows and adjacent flow passages and directions of the second flows are arranged in a parallel relationship with respect to each other at least in a portion of the parallel flow region and are fluidly separated by wall portions. A cross section of the wall portions of the parallel flow region orthogonal to a local flow passage direction of the parallel flow region is a grid-like pattern including a group of m lines spaced from each other and a group of n lines spaced from each other, the m lines and the n lines defining a plurality of points of intersection and a boundary line section between two points of intersection, each boundary line section being part of a boundary line delimiting a cross section of a flow duct of the first and
(Continued)

second flow ducts, wherein at least some of the boundary line sections are continuous lines having a positive slope portion and a negative slope portion with respect to a straight line between the two points of intersection.

22 Claims, 12 Drawing Sheets

(58) Field of Classification Search
USPC .......................................................... 165/164
See application file for complete search history.

(56) References Cited

U.S. PATENT DOCUMENTS

| 9,657,999 | B2* | 5/2017 | Newman | F28F 9/028 |
|---|---|---|---|---|
| 10,092,985 | B2* | 10/2018 | Dziubinschi | F28F 1/022 |
| 10,393,446 | B2 | 8/2019 | Wagner et al. | |
| 10,816,282 | B2* | 10/2020 | Turney | F28F 9/0282 |
| 11,022,373 | B2* | 6/2021 | Henderson | F28F 1/022 |
| 11,333,438 | B2* | 5/2022 | St. Rock | F28D 7/0008 |
| 2013/0264031 | A1 | 10/2013 | Plourde et al. | |
| 2017/0198976 | A1 | 7/2017 | Turney et al. | |
| 2021/0116188 | A1* | 4/2021 | Roper | F28F 9/0202 |

FOREIGN PATENT DOCUMENTS

| EP | 3 225 948 B1 | | 7/2019 | |
|---|---|---|---|---|
| JP | 2023073882 A | * | 5/2023 | |
| WO | WO 95/09338 | | 4/1995 | |
| WO | WO-2023090078 A1 | * | 5/2023 | |

OTHER PUBLICATIONS

EPO (Riswijk, NL), Written Opinion of the International Searching Authority, Form PCT/ISA/237, for International Application PCT/EP2021/076865, Jan. 18, 2022 (8 pages).

* cited by examiner

CHANNEL HEAT EXCHANGER

CROSS REFERENCE TO RELATED APPLICATION

This application is a National Phase filing in the United States, under 35 USC § 371, of PCT International Patent Application PCT/EP2021/076865, filed on 29 Sep. 2021 which claims the priority of Swiss Patent Application CH 01244/20, filed on 30 Sep. 2020.

The above-referenced applications are hereby incorporated by reference herein in their entirety and is made a part hereof, including but not limited to those portions which specifically appear hereinafter.

BACKGROUND OF THE INVENTION

Field of the Invention

The invention relates to a heat exchanger for exchanging heat energy between first flows and second flows of fluid passing through this heat exchanger.

Discussion of Related Art

Channel heat exchangers are known.

A first typical example of a known channel heat exchanger with flow ducts having substantially rectangular cross sections is described in EP0720720B1.

A second typical example of a known channel heat exchanger with flow ducts having substantially triangular cross sections is described in EP0666973B1.

Such known channel heat exchangers provide satisfactory heat exchange performance, i.e., a reasonably high amount of heat transfer per unit time between the first flows constituted by a first fluid and the second flows constituted by a second fluid with a reasonably low amount of pressure drop along the first flows and along the second flows within such heat exchangers.

However, in such channel heat exchangers, there is still room for improvement.

SUMMARY OF THE INVENTION

It is an object of the invention to provide a novel channel heat exchanger having improved heat exchange performance compared to a known channel heat exchangers of the type outlined above.

In particular, it is an object of the invention to provide a novel channel heat exchanger having a significantly increased amount of heat transfer per unit time with substantially no or an insignificant increase in pressure drop along the first and second flows.

The invention provides a heat exchanger comprising:
- a plurality of first flow ducts and a plurality of second flow ducts adjacent to the plurality of first flow ducts for exchanging heat energy between first flows of a first fluid passing through the plurality of first flow ducts and second flows of a second fluid passing through the plurality of second flow ducts;
- a parallel flow region where flow passages and directions of the first flows of the plurality of first flow ducts and adjacent flow passages and directions of the second flows of the plurality of second flow ducts are arranged in locally or tangentially parallel relationship with respect to each other at least in a portion of the parallel flow region and are fluidly separated by wall portions from each other;
- wherein a cross section of the wall portions of the parallel flow region orthogonal to a local flow passage direction of the parallel flow region is a grid-like pattern comprising a first group of m lines spaced from each other and a second group of n lines spaced from each other, the first group of m lines and the second group of n lines defining a plurality of points of intersection and a boundary line section between two points of intersection, each boundary line section being part of a boundary line delimiting a cross section of a flow duct of the plurality of first flow ducts and the plurality of second flow ducts;
- wherein at least some, or all, of the boundary line sections are continuous lines having a positive slope portion and a negative slope portion with respect to an imaginary straight line between the two points of intersection.

As a result, due to these positive and negative slope portions, the total length of a boundary line delimiting a flow duct cross section is increased with respect to a boundary line composed of merely straight lines between cross section corner points defining triangles or rectangles. Similarly, according to the invention, the total surface area of the wall portions delimiting a flow duct is increased with respect to a flow duct which is delimited by mere planar surface area portions between corner lines of the flow duct. Thus, an increase in heat exchange performance is achieved.

The wall portions are typically membranes, e.g., these may have water vapor transmission characteristics.

The heat exchanger according to the invention may be produced using additive manufacturing for building the entire heat exchanger block in a layer-by layer fashion.

Alternatively, the heat exchanger according to the invention may be produced by first extruding a plurality of heat exchanger plates, i.e., profiled plates, such as membranes, with a suitable profile and then stacking these heat exchanger plates to form a stack of heat exchanger plates which constitute the heat exchanger. In some embodiments, adjacent plates in the stack are sealed by welding or gluing the contact areas between adjacent plates. Alternatively, each plate may have a plurality of formations of a first type and a plurality of formations of a second type complementary to the first type. For instance, such formations may comprise protruding portions, preferable linear protrusions or ridges parallel to the flow passages and corresponding linear recesses or grooves parallel to the flow passages. As a result, when stacking these heat exchanger plates, the formations of the first type and the formations of the second type will engage, thus making it easier for the plates to be securely stacked in a defined manner and also improving the sealing between adjacent plates and adjacent flow passages with or without welding or gluing.

Instead of extruding heat exchanger plates to be stacked, some types of heat exchanger plate geometries lend themselves to thermo forming/vacuum forming as an alternative plate shaping method. These thermo formed/vacuum formed heat exchanger plates are then stacked in a similar fashion as described in the previous paragraph.

In some embodiments, the boundary line sections may be plane symmetrical with respect to a symmetry plane being parallel to the direction of the local flow passage direction or point symmetrical with respect to the center point of the corresponding boundary line between two points of intersection.

In some embodiments, the boundary line sections are lines with a least a portion of the lines being curved. The curvature of this curved portion may be dome-shaped.

In some embodiments, the boundary line sections are lines having a portion with positive curvature, e.g., a left bend, and a portion with negative curvature, e.g., a right bend with respect to the imaginary straight line between the two points of intersection. The combined curvatures of these curved portions may in the cross section orthogonal to a local flow passage direction at least partially or fully be V-shaped or U-shaped. Alternatively, the boundary line sections may in the cross section orthogonal to a local flow passage direction have the shape of a bell-curve.

In some embodiments, the boundary line sections are lines having at least one point of inflection. It is understood that this refers to the boundary line sections in the cross section orthogonal to a local flow passage direction.

In other words, the boundary line sections comprise at least one curvature portion with a left bend and one curvature portion with a right bend. The combined curvatures of these curved portions may have the shape of bell, i.e., two left bend portions and one right bend portion in between with two points of inflection. Alternatively, the combined curvatures of these curved portions may have the shape of a wave, i.e., one left bend portion and one right bend portion with one point of inflection.

In some embodiments, the boundary line sections are lines with a least a portion, or only in a portion, of the lines being straight. In certain embodiments, the boundary line sections may in the cross section orthogonal to a local flow passage direction have a V-shape or a zig-zag shape.

In some embodiments, the boundary line sections have at least one point of intersection, a so-called "zero point" with the imaginary straight line between the two points of intersection. As a result, a first surface of a duct wall portion has a concave, respectively indented, portion next to a convex, respectively bulging, portion, and a corresponding second surface of this duct wall portion has a complementary shape with a convex, respectively bulging, portion next to a concave, respectively indented, portion, respectively. The combination of these portions may have a wave shape or a sawtooth shape, respectively a zigzag shape.

In some embodiments, the boundary line sections are lines having only one point of inflection. Therefore, they may have a wave-like, respectively sinusoidal, shape.

In some embodiments, the boundary line sections are lines having only two points of inflection. They may have a bell-shaped indentation, or protrusion. Typically, a first surface of a duct wall portion has a concave, respectively indented, portion and a corresponding second surface of this duct wall portion has a complementary convex, respectively bulging, portion.

In some embodiments, within the parallel flow region, the flow passages of the plurality of first flow ducts and adjacent flow passages of the plurality of second flow ducts are arranged in locally or tangentially parallel relationship with respect to each other at least in a major portion, i.e., at least more than 50%, of the parallel flow region.

As a result, a major portion of the flow passages within this parallel flow region, which typically contributes the main part of the total heat exchange between the first and second flows, are in good thermal contact with each other. A minor portion of the parallel flow region may comprise local bends and offsets in the flow passages defined by the first flow ducts and the second flow ducts.

In some embodiments, an angle of intersection at the points of intersection is comprised between 60° and 90° and its complementary angle of intersection is comprised between 120° and 90°. As a result, there are no internal corners in the flow ducts with angles smaller than 60°. This prevents dead zones in the corners where the fluid tends to flow more slowly and/or minimizes the thickness of boundary layers with stagnant fluid particles both of which contribute to reducing heat exchange between the first fluid and the second fluid. It is clear that the angles refer to the angle between a lines of the first group and a line of the second group at the intersection point.

In some embodiments, the angle of intersection at the points of intersection is comprised between 85° and 90° and its complementary angle of intersection is comprised between 95° and 90°.

In some embodiments, the angle of intersection and its complementary angle of intersection at the points of intersection is 90°.

In some embodiments, a point of intersection of the plurality of points of intersection defines a corner of a flow duct profile of the plurality of first flow ducts and the plurality of second flow ducts.

In some embodiments, a point of intersection of the plurality of points of intersection defines an internal corner of four adjacent flow ducts of the plurality of first flow ducts and the plurality of second flow ducts.

In some embodiments, four adjacent points of intersection of the plurality of points of intersection define four internal corners of a flow duct of the plurality of first flow ducts and of the plurality of second flow ducts, and four boundary line sections together define four wall portions of a flow duct of the plurality of first flow ducts and of the plurality of second flow ducts. In other words, each of the four boundary lines defines a wall portion of the flow duct.

In some embodiments, these four adjacent points of intersection define the corner points of an imaginary parallelogram.

As a result, the increased length of the two sheared imaginary boundary lines of this parallelogram, compared to the length of two non-sheared imaginary boundary lines of a corresponding rectangle prior to shearing, contributes to an increase in total length of a boundary line delimiting a flow duct cross section. This increase is in addition to and independent of the increase achieved by the positive and negative slope portions, as explained earlier. Thus, the total length of a parallelogram-type boundary line delimiting a flow duct cross section is increased with respect to a rectangle-type boundary line composed of merely orthogonal straight lines between cross section corner points. Similarly, as described above, the total surface area of the wall portions delimiting a flow duct is increased with respect to a flow duct which is delimited by mere planar surface area portions between corner lines of the flow duct. Thus, an even greater increase in heat exchange performance is achieved.

The heat exchanger plates for this parallelogram-type geometry can be manufactured by at least profiled plate extrusion, as outlined above.

In some embodiments, the four adjacent points of intersection define the corner points of an imaginary rectangle.

The heat exchanger plates for this rectangle-type geometry can be manufactured by at least profiled plate extrusion or thermo forming/vacuum forming.

In some embodiments, at least two opposite wall portions have boundary line sections with identical shapes. As a result, the gain in surface area due to the opposite wall portions of a flow duct does not affect the surface area of the cross section if this flow duct.

In some embodiments, a first pair of opposite wall portions have boundary line sections having a positive slope portion and a negative slope portion with respect to the imaginary straight line between the two points of intersection, and a second pair of opposite wall portions have straight boundary line sections.

In particular, a first pair of opposite wall portions may have curved boundary line sections and a second pair of opposite wall portions have straight boundary line sections.

The heat exchanger plates of this geometry can be manufactured by at least profiled plate extrusion or thermo forming/vacuum forming. Of course, profiled plate extrusion for the plates and additive manufacturing for the entire stack of plates is also possible.

In some embodiments, a first pair of opposite wall portions have boundary line sections having a positive slope portion and a negative slope portion with respect to a straight line between the two points of intersection at the beginning and at the end of each of the boundary line sections, and a second pair of opposite wall portions have boundary line sections having a positive slope portion and a negative slope portion with respect to the straight line between the two points of intersection at the beginning and at the end of each of the boundary line sections.

In particular, a first pair of opposite wall portions have curved boundary line sections and a second pair of opposite wall portions have curved boundary line sections.

The heat exchanger plates of this geometry can be manufactured by at least profiled plate extrusion. Of course, additive manufacturing for the entire stack of plates is also possible.

In some embodiments, the heat exchanger according to the invention further comprises a first cross flow region where flow passages of the plurality of first flow passages and adjacent flow passages of the plurality of second flow passages are arranged in crosswise relationship with respect to each other, the first cross flow region having a first opening region including open ends of the first flow passages and having a second opening region including open ends of the second flow passages; and a second cross flow region where flow passages of the plurality of first flow passages and adjacent flow passages of the plurality of second flow passages are arranged in crosswise relationship with respect to each other, the second cross flow region having a first opening region including the opposite open ends of the second flow passages and having a second opening region including the opposite open ends of the first flow passages; the first cross flow region, the parallel flow region and the second cross flow region being arranged in series along the first flow passages and along the second flow passages, with the parallel flow region being fluidly located between the first cross flow region and the second cross flow region along the first flow passages and along the second flow passages.

At least some or each of the flow ducts of the plurality of first flow ducts and of the plurality of second flow ducts may have a constant cross-section along its entire length through the parallel flow region.

Alternatively, at least some of the flow ducts of the plurality of first flow ducts and the plurality of second flow ducts have a varying cross-section along their entire length through the parallel flow region.

In some embodiments, the wall portions delimiting the flow ducts from adjacent flow ducts comprise polymer material.

In some embodiments, the wall portions comprise a sheet-like support portion with voids and a selectively water vapor transmitting polymer.

In some embodiments, the sheet-like support portion with voids comprises at least one layer of a woven or non-woven material, a porous material, and a perforated material.

In some embodiments, the voids are filled with the selectively water vapor transmitting polymer.

Alternatively, or in addition, the sheet-like support portion with voids may be covered with a film of the selectively water vapor transmitting polymer.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims.

DETAILED DESCRIPTION OF THE INVENTION

Figure 1:
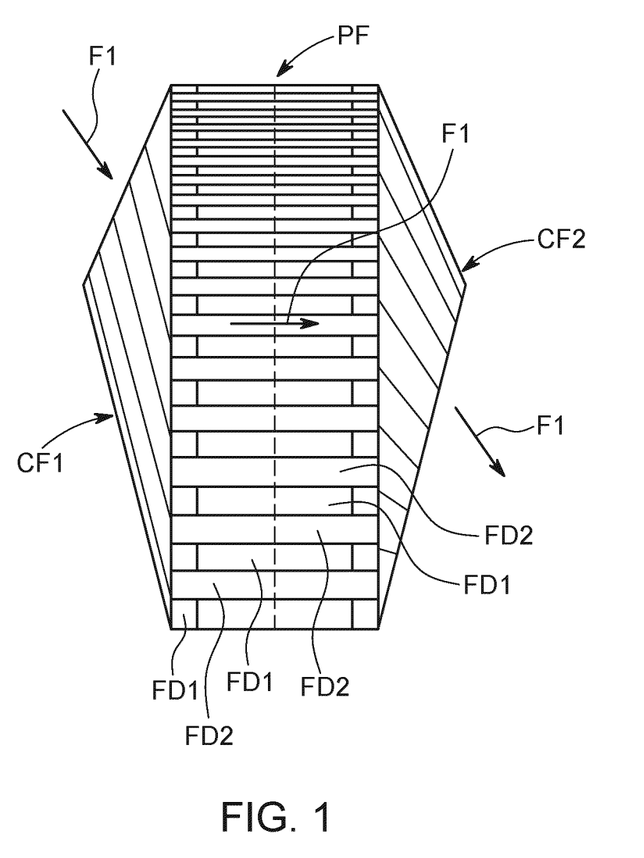
FIG. 1 shows a cross-sectional view of a first heat exchanger element of a heat exchanger according to an embodiment of the invention.
Figure 2:
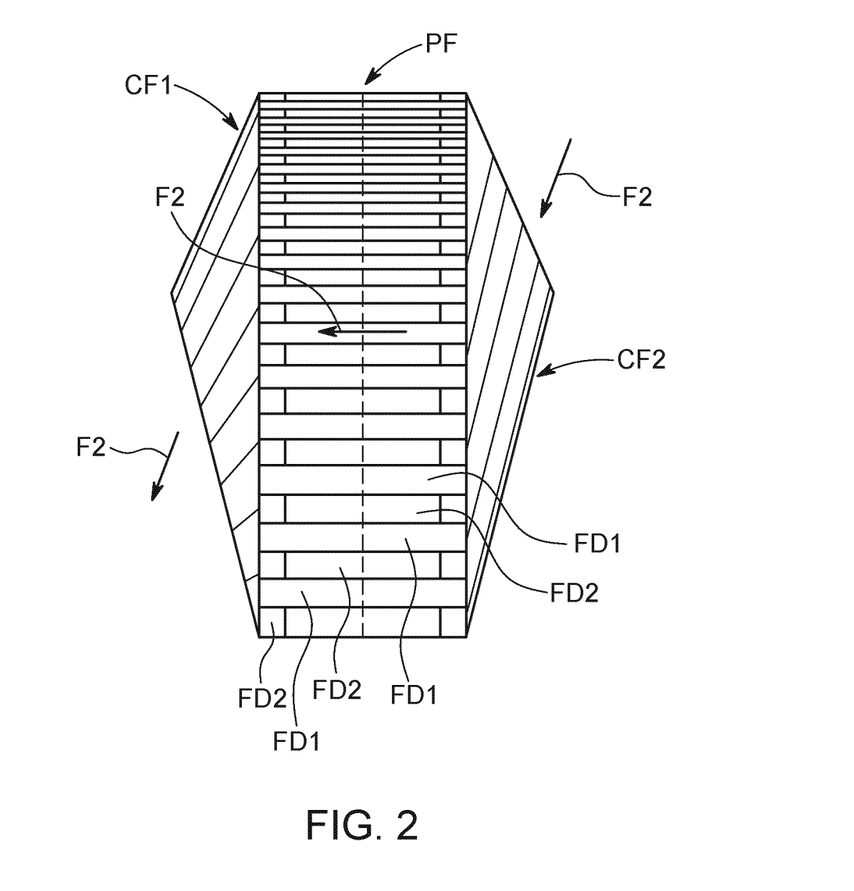
FIG. 2 shows a cross-sectional view of a second heat exchanger element being adjacent to the first heat exchanger element of FIG. 1, of the heat exchanger according to the embodiment in FIG. 1.

FIG. 1 and FIG. 2 shows a cross section of a heat exchanger according to the invention. FIG. 1 shows a view onto a first heat exchanger element. This heat exchanger element has a first cross flow region CF1 where flow passages of the plurality of first flow passages of the first flow F1 are angled, i.e., in an angle of between 5° and 85°, with respect to the first flow passages in parallel flow region PF. In a similar manner, second cross flow region CF2 of the heat exchanger has a plurality of first flow passages of the first flow F1 which are angled, i.e., in an angle of between 5° and 85°, with respect to the first flow passaged in parallel flow region PF. FIG. 2 shows a second heat exchanger element which is directly adjacent to the first heat exchanger element of FIG. 1. In a heat exchanger according to the invention, such first and second heat exchanger elements are stacked in series in an alternating manner. As can be seen, second heat exchanger element defines the second flow passages for second flow F2. Also, this heat exchanger element, has a first cross flow region CF1 where flow passages of the plurality of first flow passages of the second flow F2 are angled, i.e., in an angle of between 5° and 85°, with respect to the first flow passages in parallel flow region PF. In a similar manner, second cross flow region CF2 of the heat exchanger has a plurality of first flow passages of the second flow F2 which are angled, i.e., in an angle of between 5° and 85°, with respect to the first flow passaged in parallel flow region PF. The second heat exchanger element is mirror symmetric to the first heat exchanger element. Thus, when these are stacked in an alternating manner, first and second air flows F1 and F2 flow in parallel or in exact opposite directions in the parallel flow region PF and they cross each other both in the first and second cross flow region CF1 and CF2.

Figure 3:
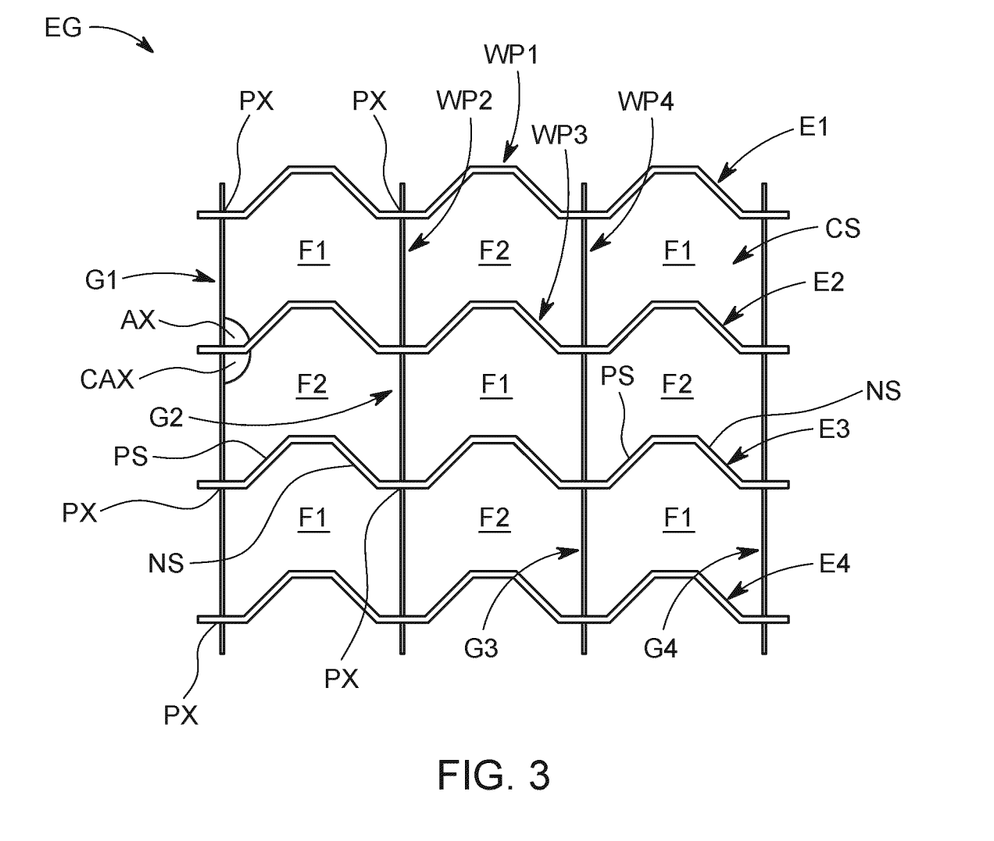
FIG. 3 shows a cross-sectional view along the cross-section of the wall portions of the parallel flow region orthogonal to a local flow passage direction of the parallel flow region of a heat exchanger according to another embodiment of the invention.

FIG. 3 shows a heat exchanger with a plurality of first flow ducts for a first flow F1 and a plurality of second flow ducts adjacent to the plurality of first flow ducts for a second flow F2 for exchanging heat energy between first flows F1 passing through the plurality of first flow ducts and second flows F2 passing through the plurality of second flow ducts.

In the shown parallel flow region PF of the heat exchanger the flow passages and directions of the first flows F1 of the plurality of first flow ducts and adjacent flow passages and directions of the second flows F2 of the plurality of second flow ducts are arranged in locally or tangentially parallel relationship with respect to each other at least in a portion of the parallel flow region, or in the complete parallel flow region and are fluidly separated by wall portions WP1, WP2, WP3, WP4 from each other.

A cross section of the wall portions of the parallel flow region PF in a cross-sectional plane being orthogonal to a local flow passage direction of the parallel flow region PF is a grid-like pattern. With other words, in the parallel flow region there are different cells along this cross section which are arranged in a grid-like or matrix-like manner. The grid-like pattern comprises in this cross section, a first group of m lines E1, E2, E3 and E4 spaced apart from each other and a second group of n lines G1, G2, G3 and G4 spaced apart from each other. It is understood that the term "lines" applies for this cross section, respectively the cross-sectional view, while in the heat exchanger as such, these lines define the wall portions and thus extend in at least 2 or even 3 spatial dimensions.

The first group of m lines and the second group of n lines define a plurality of points of intersection PX between each other, i.e., points at which in the cross section of the wall portions of the parallel flow region PF in a cross-sectional plane being orthogonal to a local flow passage direction of the parallel flow region PF, a lines of the first group and a line of the second group intersect each other.

Furthermore, the first group of m lines and the second group of n lines define a boundary line section BLS between two points of intersection PX. Each boundary line section BLS1, BLS2, BLS3, BLS4 is part of a boundary line delimiting a cross section CS of a certain flow duct of the plurality of first flow ducts and the plurality of second flow ducts.

At least some of the boundary line sections BLS1, BLS2, BLS3, BLS4 are continuous lines having a positive slope portion PS and a negative slope portion NS with respect to an imaginary straight line between the two points of intersection PX. These boundary line sections define the shape, respectively the cross-sectional shape, of the wall portions of each flow duct. In the embodiment shown, only the boundary line sections defined by the first group of lines E1, E2, E3 and E4 each have such a positive slope, while the group of second lines are straight lines between the corresponding two points of intersection. In the cross section orthogonal to a local flow passage direction of the parallel flow region, the first group of m lines E1, E2, E3 and E4 and the corresponding boundary line sections are essentially V-shaped, with a portion of the boundary line section being straight, i.e., with a slope 0, respectively a portion which is parallel to the imaginary straight line between the points of intersection.

In general, a first flow duct for a first flow F1 is always adjacent only to second flow ducts for a second flow F2 and vice versa.

As can be seen from FIG. 3, the first group of m lines E1 to E4 all have the same shape and all extend at any given position in parallel to each other. The same applies to all lines of the second group of n lines G1 to G4. This may apply to this and all other embodiments described herein and serves to differentiate the first and second group of lines from each other. Furthermore, none of the lines of the first group of m lines E1 to E4 intersect each other. Vice versa, none of the lines of the second group of n lines G1 to G4 intersect each other. This may apply to this and all other embodiments described herein and serves to differentiate the first and second group of lines from each other.

FIG. 3 further shows the angle of intersection AX, being defined by first group line E2 and second group line G1 at their point of intersection. Also, the complementary angle of intersection CAX is shown.

Figure 4:
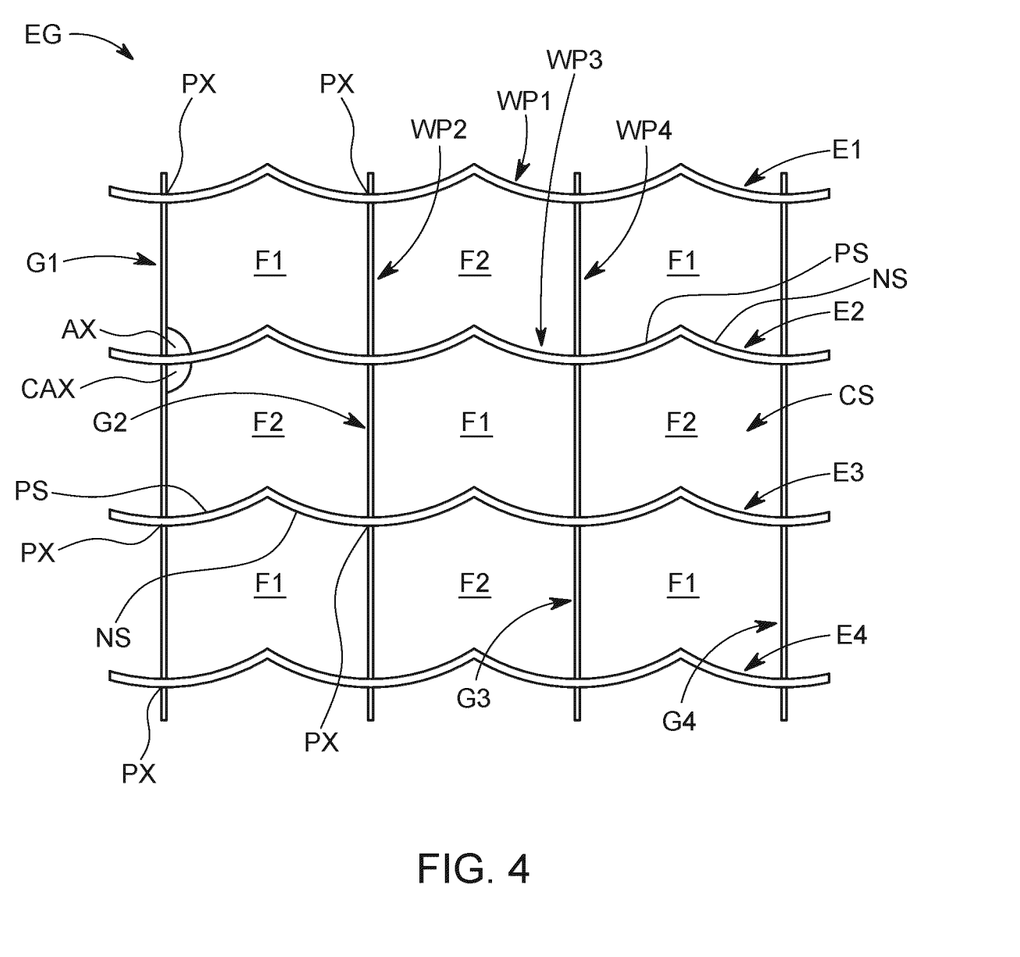
FIG. 4 shows a cross-sectional view along the cross-section of the wall portions of the parallel flow region orthogonal to a local flow passage direction of the parallel flow region of a heat exchanger according to another embodiment of the invention.

FIG. 4 shows another embodiment of a heat exchanger according to the invention. In contrast to FIG. 3, the cross section of the wall portions of the parallel flow region PF orthogonal to a local flow passage direction of the parallel flow region has a different shape. While the shape of second group lines G1 to G4 is the same as in FIG. 3, the shape of first group lines E1 to E4 is different. They still define boundary line sections which are continuous lines having a positive slope portion PS and a negative slope portion NS with respect to a straight line between the two points of intersection PX, but in this embodiment a portion of the lines are curved. While a first portion of each boundary line section defined by first group lines G1 to G4 forms a left curve, a second portion forms a right curve. As can be seen, the boundary line section defined by first group lines G1 to G4 are symmetric with respect to a symmetry plane being perpendicular to the shown cross-section, i.e., a plane extending along the local flow passage direction.

Figure 5:
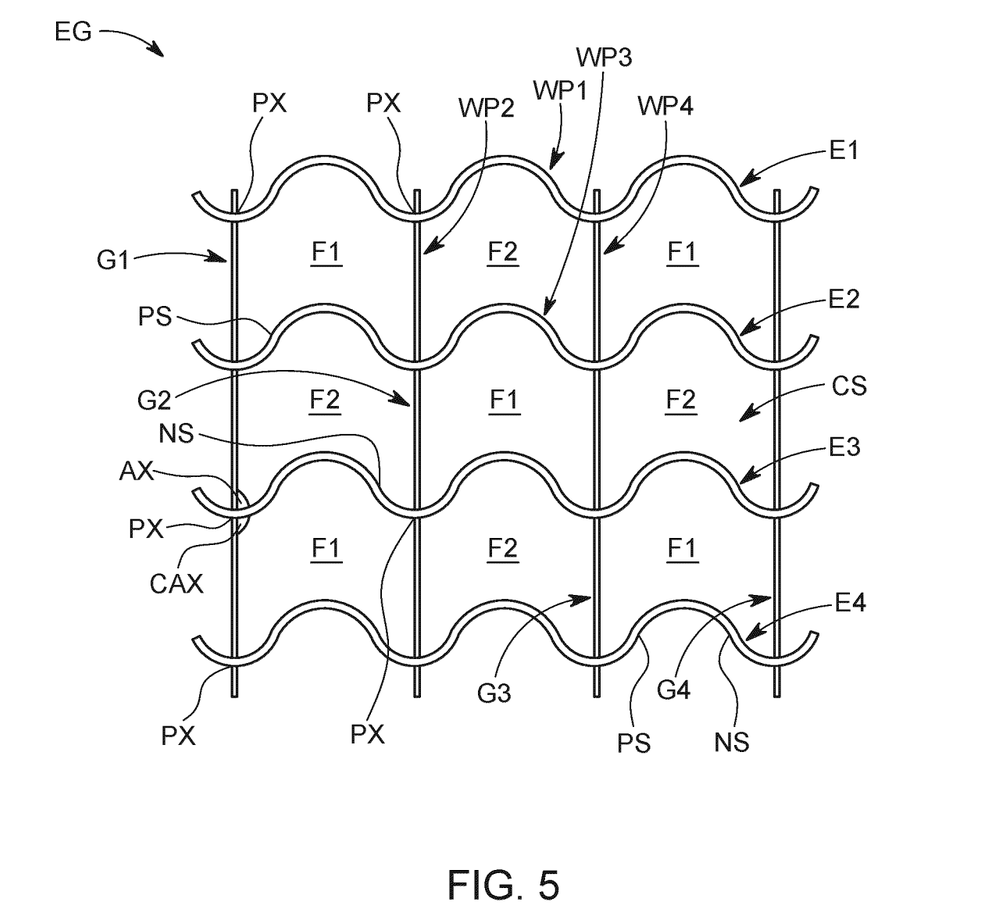
FIG. 5 shows a cross-sectional view along the cross-section of the wall portions of the parallel flow region orthogonal to a local flow passage direction of the parallel flow region of a heat exchanger according to another embodiment of the invention.

FIG. 5 shows another embodiment of the invention. In contrast to FIG. 3, the cross section of the wall portions of the parallel flow region PF orthogonal to a local flow passage direction of the parallel flow region has a different shape. While the shape of second group lines G1 to G4 is the same as in FIG. 3, the shape of first group lines E1 to E4 is different. They still define boundary line sections which are continuous lines having a positive slope portion PS and a negative slope portion NS with respect to a straight line between the two points of intersection PX, but in this embodiment a portion of the lines are curved. Furthermore, each boundary section defined by the first group of lines comprises two points of inflection, which results in a bell shaped curve.

Figure 6:
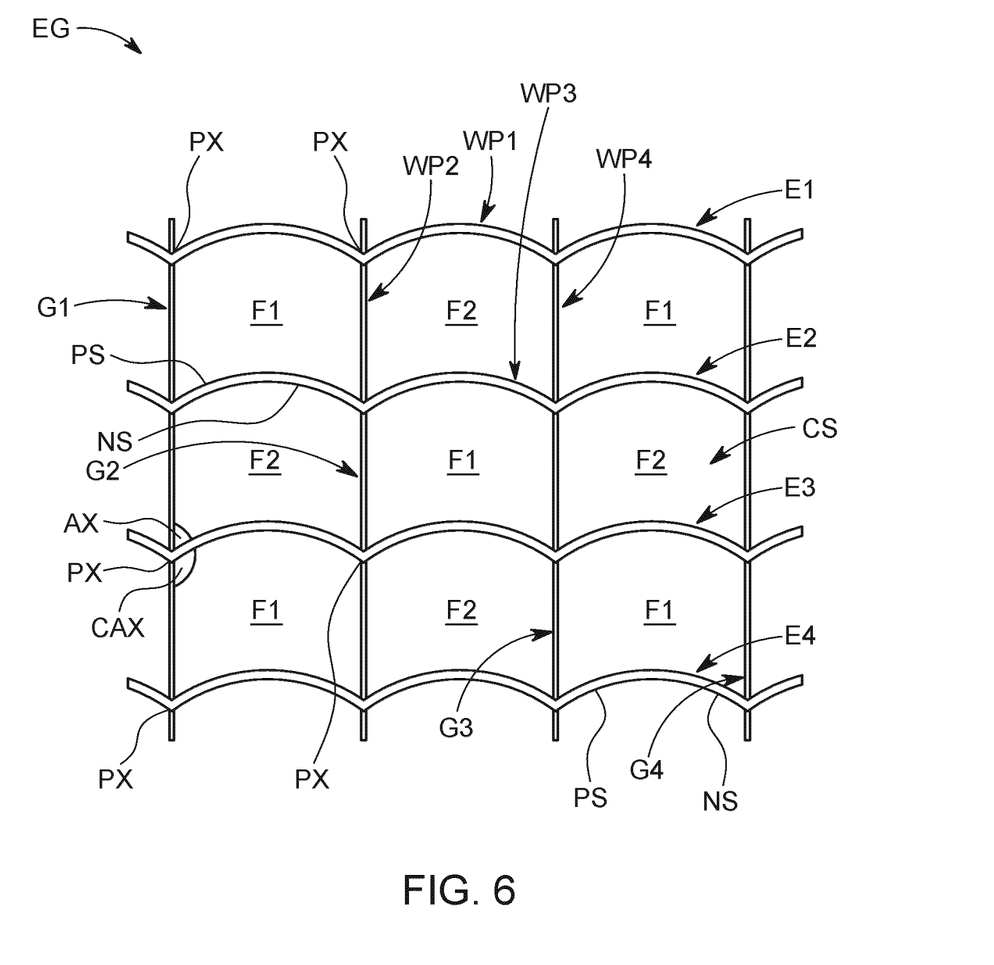
FIG. 6 shows a cross-sectional view along the cross-section of the wall portions of the parallel flow region orthogonal to a local flow passage direction of the parallel flow region of a heat exchanger according to another embodiment of the invention.

FIG. 6 shows another embodiment of a heat exchanger according to the invention. In contrast to FIG. 3, the cross section of the wall portions of the parallel flow region PF orthogonal to a local flow passage direction of the parallel flow region has a different shape. While the shape of second group lines G1 to G4 is the same as in FIG. 3, the shape of first group lines E1 to E4 is different. They still define boundary line sections which are continuous lines having a positive slope portion PS and a negative slope portion NS with respect to a straight line between the two points of intersection PX, but in this embodiment a portion of the lines are curved. In contrast to FIG. 4 however, each boundary line section defined by the first group lines E1 to E4 forms only right curves.

Figure 7:
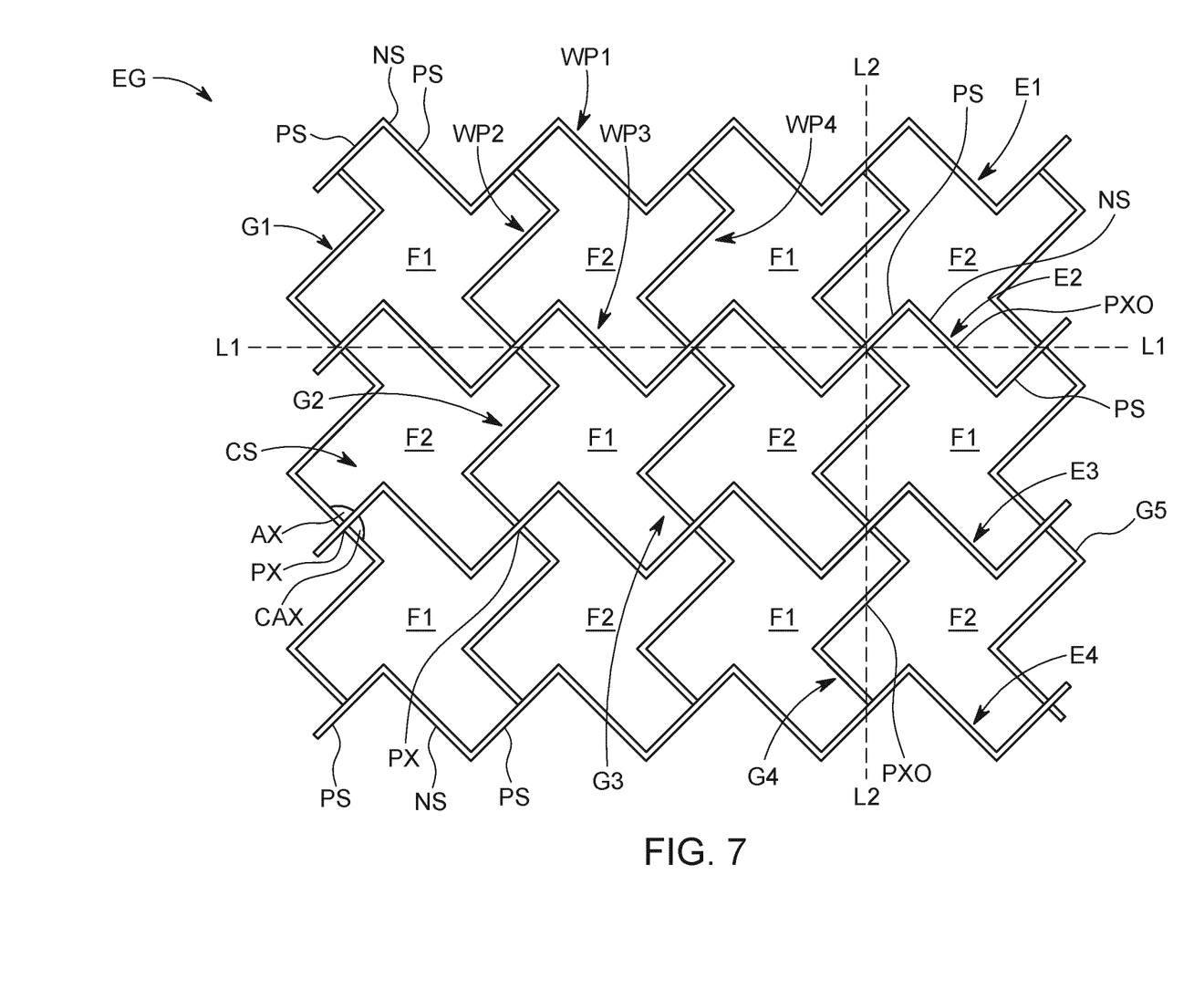
FIG. 7 shows a cross-sectional view along the cross-section of the wall portions of the parallel flow region orthogonal to a local flow passage direction of the parallel flow region of a heat exchanger according to another embodiment of the invention.

FIG. 7 shows another embodiment of a heat exchanger according to the invention. In contrast to the embodiments, shown in FIGS. 3 to 6, not only first group lines E1 to E4 define boundary line sections which are continuous lines having a positive slope portion PS and a negative slope portion NS with respect to a straight line between the two points of intersection PX, but so do also second group lines G1 to G5. This results in the fact that the wall portions WP1 to WP4 of each flow duct are all angled, i.e. not straight. In this particular embodiment, both the boundary line sections defined by first group lines E1 to E4 and the boundary line sections defined by second group lines G1 to G5 have a zig-zag shape. Furthermore, each of these boundary line sections have at least one point of intersection PX0 with the straight line between the two points of intersection (see for example imaginary straight line L1 or L2).

Figure 8:
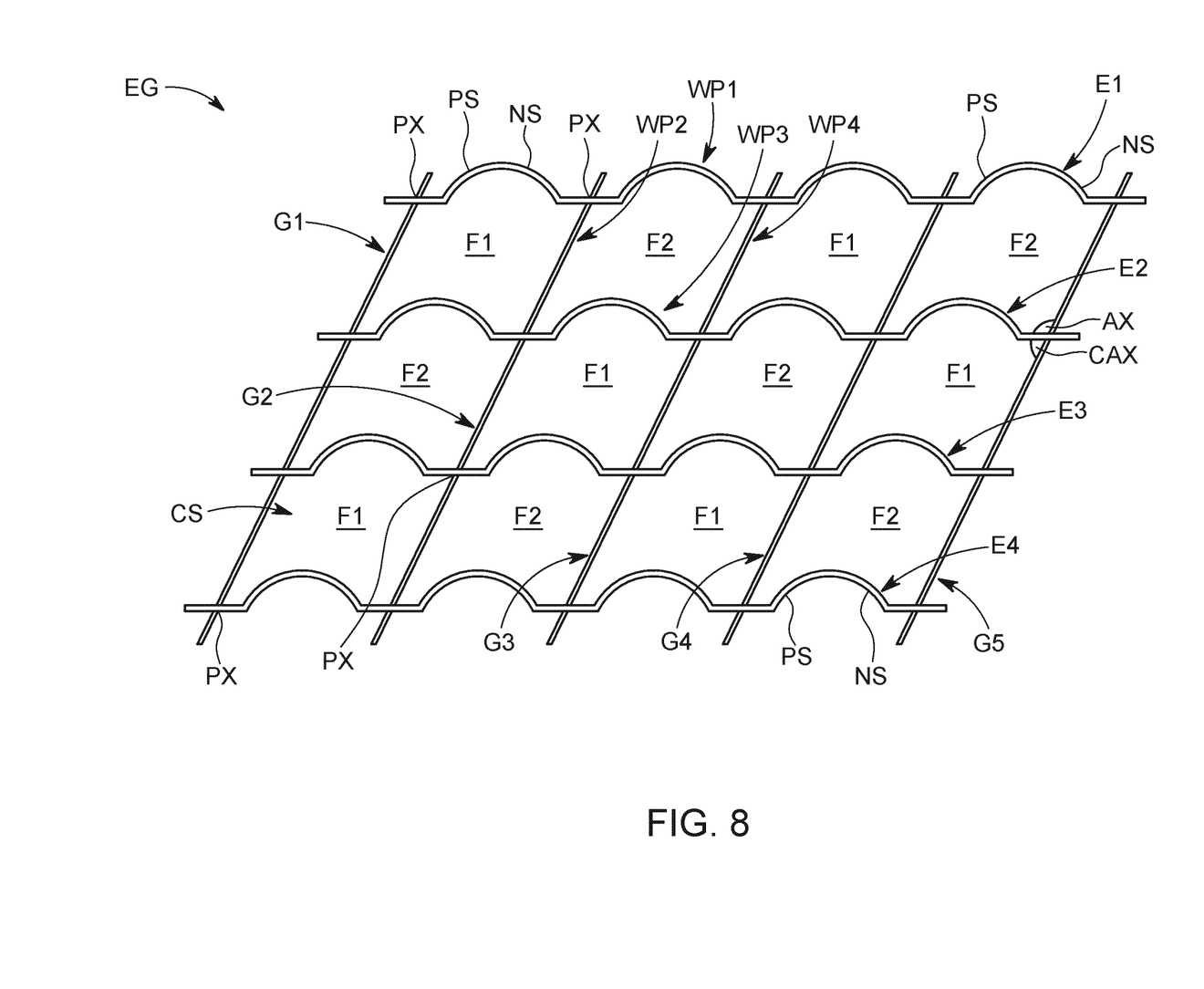
FIG. 8 shows a cross-sectional view along the cross-section of the wall portions of the parallel flow region orthogonal to a local flow passage direction of the parallel flow region of a heat exchanger according to another embodiment of the invention.

FIG. 8 shows another embodiment of a heat exchanger according to the invention. In contrast to FIG. 3, the cross section of the wall portions of the parallel flow region PF orthogonal to a local flow passage direction of the parallel flow region has a different shape. While the shape of second group lines G1 to G4 is the same as in FIG. 3, the shape of first group lines E1 to E4 is different. They still define boundary line sections which are continuous lines having a positive slope portion PS and a negative slope portion NS with respect to a straight line between the two points of intersection PX, but in this embodiment a portion of the lines are curved only within a portion, in particular the middle portion, of each boundary line section defined by first group lines E1 to E4. Within each of these boundary line sections, the curved portion is arranged between two straight line portions. The curved portion forms therefore a convex, i.e., bulge, portion of the first surface of wall portion WP3 in the corresponding flow duct for second flow F2, while it forms a concave, i.e., intended, portion of second surface of this wall portion in the corresponding flow duct for first flow F1.

Figure 9:
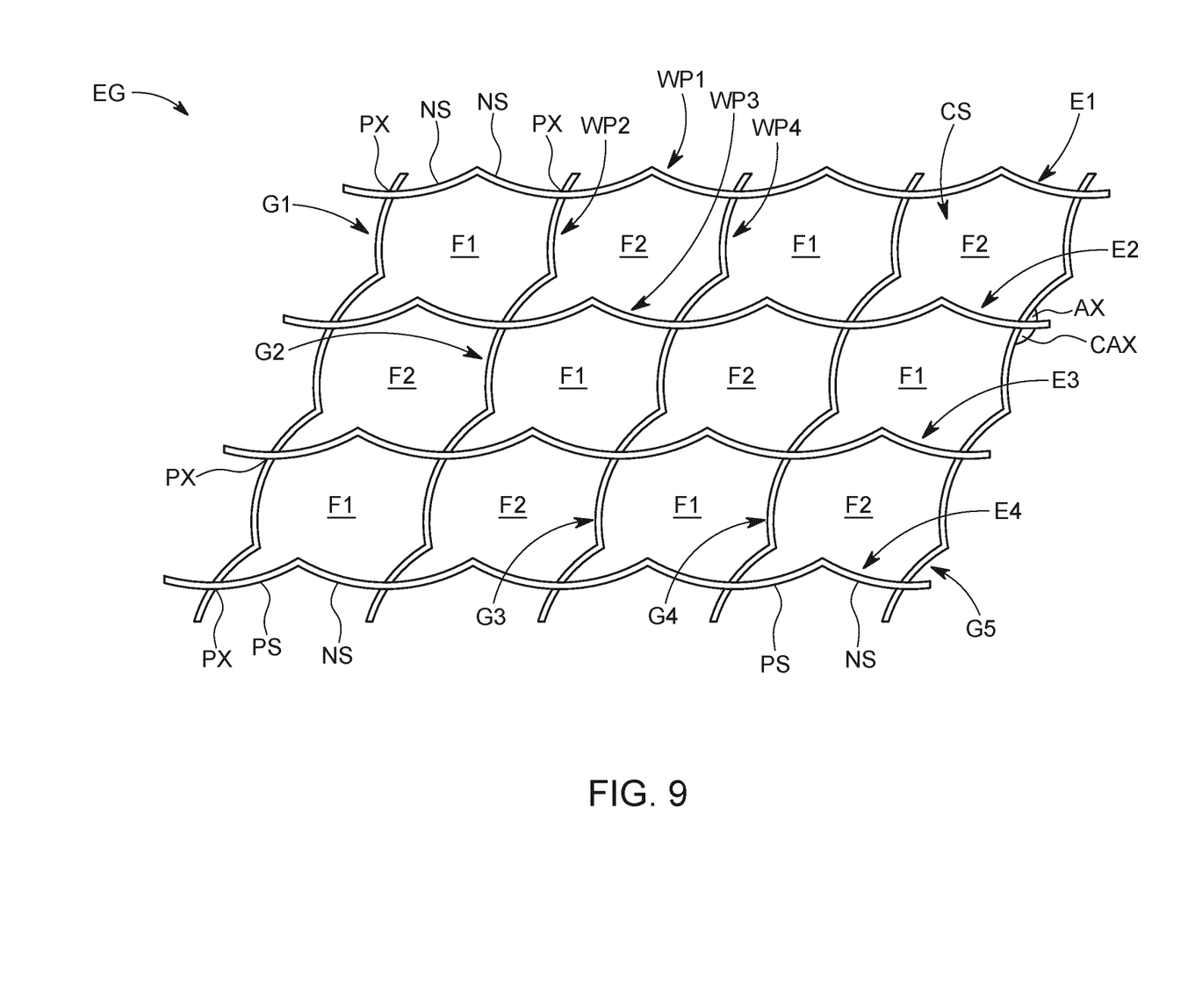
FIG. 9 shows a cross-sectional view along the cross-section of the wall portions of the parallel flow region orthogonal to a local flow passage direction of the parallel flow region of a heat exchanger according to another embodiment of the invention.

FIG. 9 shows another embodiment of a heat exchanger according to the invention. In contrast to the embodiment, shown in FIG. 3, not only first group lines E1 to E4 define boundary line sections which are continuous lines having a positive slope portion PS and a negative slope portion NS with respect to a straight line between the two points of intersection PX, but so do also second group lines G1 to G5. The shape of the boundary line sections defined by the first group lines E1 to E4 and also the shape of the second group lines G1 to G5 are the same as the shape of the boundary line sections defined by first group lines E1 to E4 in FIG. 3.

Figure 10:
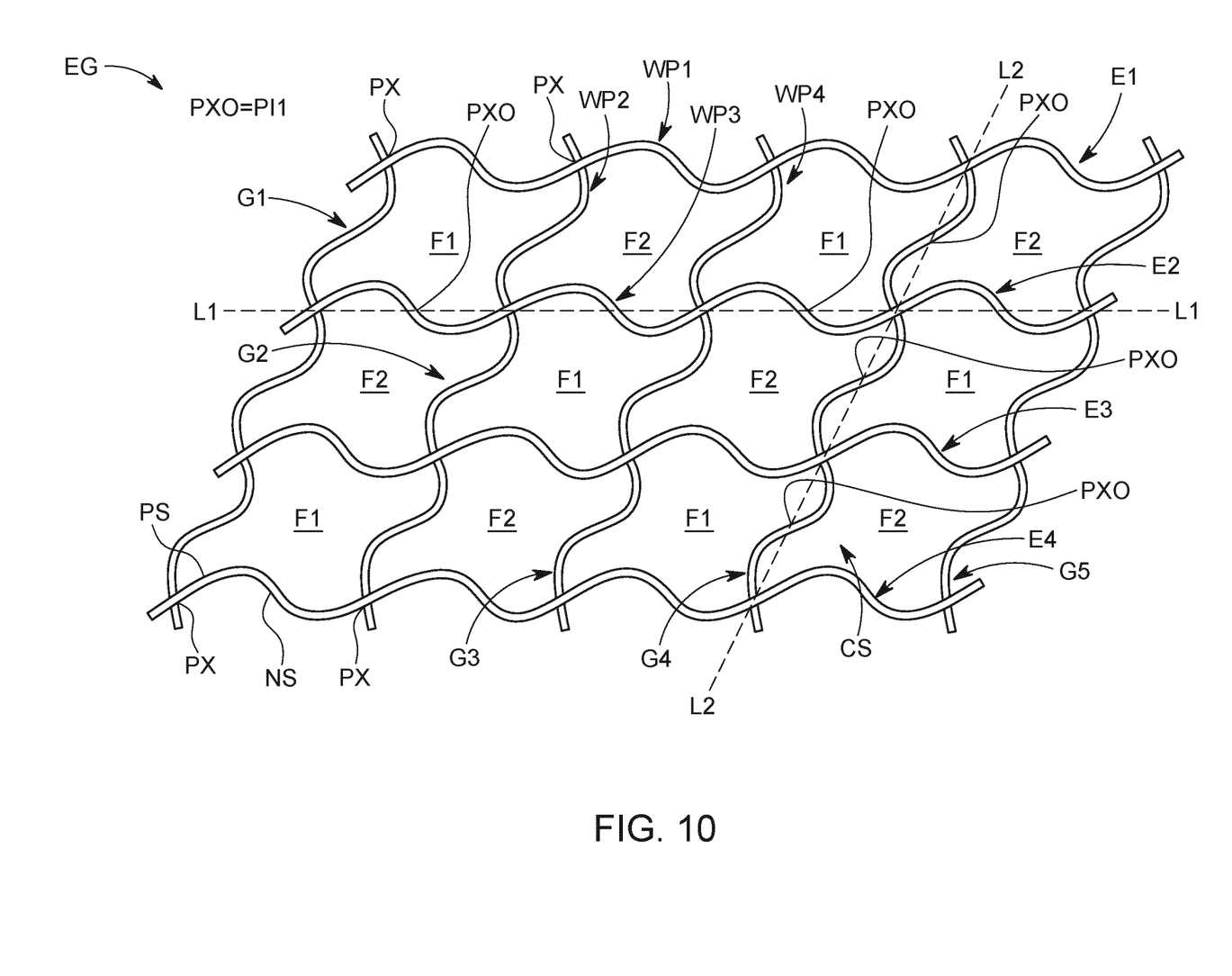
FIG. 10 shows a cross-sectional view along the cross-section of the wall portions of the parallel flow region orthogonal to a local flow passage direction of the parallel flow region of a heat exchanger according to another embodiment of the invention.

FIG. 10 shown an embodiment similar to FIG. 9. Also in this embodiment, not only first group lines E1 to E4 define boundary line sections which are continuous lines having a positive slope portion PS and a negative slope portion NS with respect to a straight line between the two points of intersection PX, but so do also second group lines G1 to G5. In contrast to FIG. 9 however, the shape of each boundary line section defined by first group lines and also by second group lines is curved and wave shaped, respectively sinusoidal. Each of the boundary line sections comprises only a single point of inflection. In this particular embodiment, the point of inflection is also the single point of each boundary line section at which the boundary line section intersects the straight line between the corresponding two points of intersection (see for example line L1 or line L2).

Figure 11:
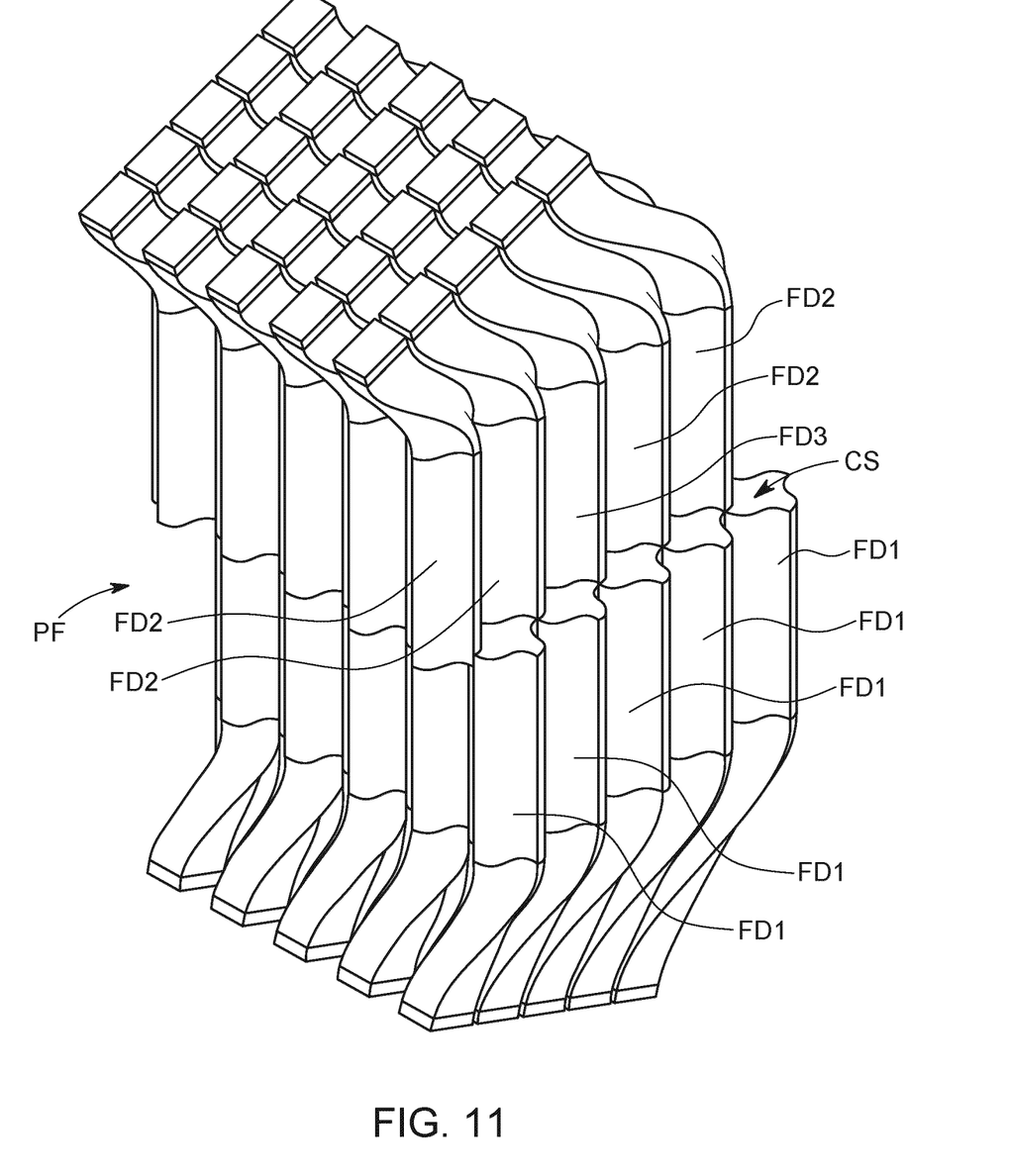
FIG. 11 shows a perspective view of a heat exchanger according to another embodiment of the invention.

FIG. 11 shows a perspective view of heat exchanger which is partially sectioned.

Figure 12:
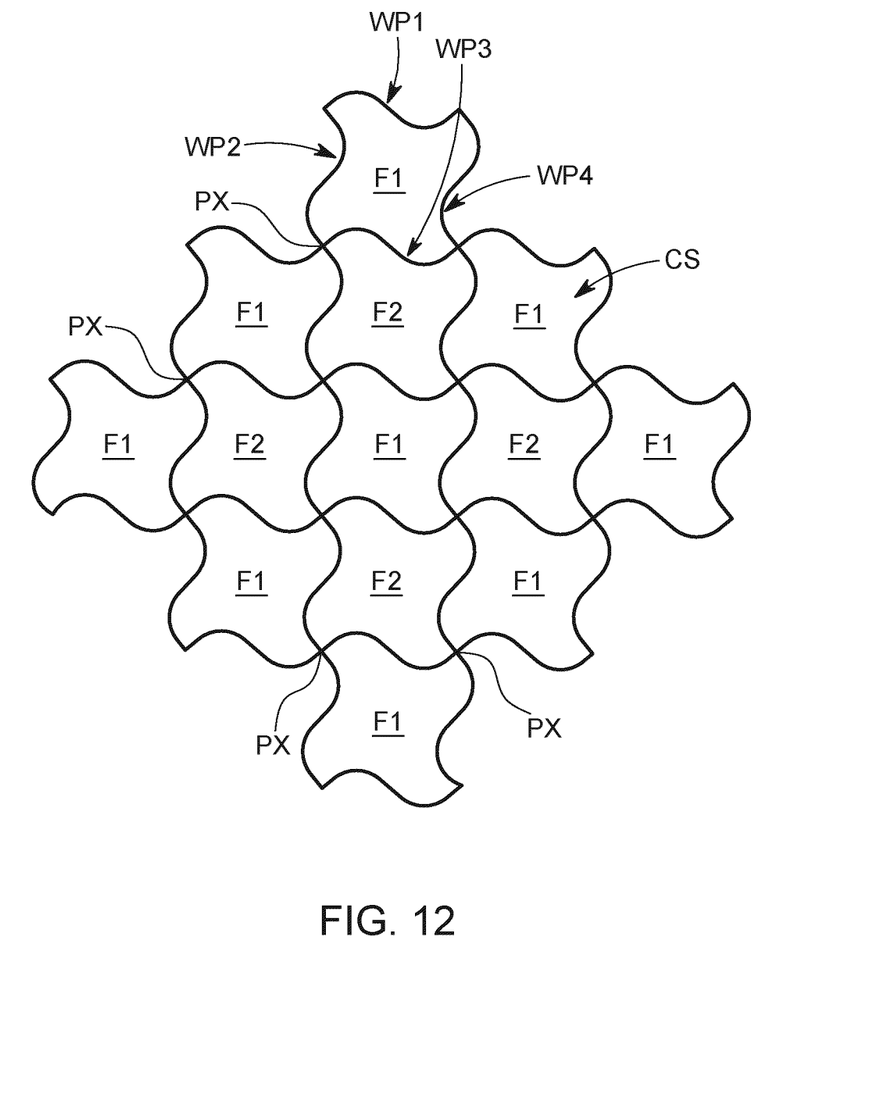
FIG. 12 shows a cross-sectional view of the heat exchanger shown in FIG. 11.

FIG. 12 shows a cross sectional view of the parallel flow region PF of the heat exchanger of FIG. 11.

The invention claimed is:
1. A heat exchanger comprising:
a plurality of first flow ducts (FD1) and a plurality of second flow ducts (FD2) adjacent to the plurality of first flow ducts for exchanging heat energy between first flows (F1) passing through the plurality of first flow ducts (FD1) and second flows (F2) passing through the plurality of second flow ducts (FD2);
a parallel flow region (PF) where flow passages and directions of the first flows (F1) of the plurality of first flow ducts (FD1) and adjacent flow passages and directions of the second flows (F2) of the plurality of second flow ducts (FD2) are arranged in a locally or tangentially parallel relationship with respect to each other at least in a portion of the parallel flow region and are fluidly separated by wall portions (WP1, WP2, WP3, WP4) from each other; and
wherein a cross section of the wall portions of the parallel flow region (PF) orthogonal to a local flow passage direction of the parallel flow region (PF) is a grid-like pattern (EF) comprising a first group of m lines (E1, E2, ..., Em) spaced from each other and a second group of n lines (G1, G2, ..., Gn) spaced from each other, the first group of m lines and the second group of n lines defining a plurality of points of intersection (PX) and a boundary line section (BLS) between two points of intersection (PX), each boundary line section (BLS1, BLS2, BLS3, BLS4) being part of a boundary line delimiting a cross section (CS) of a flow duct (FD1, FD2) of the plurality of first flow ducts (FD1) and the plurality of second flow ducts (FD2),
wherein at least some of the boundary line sections (BLS1, BLS2, BLS3, BLS4) are continuous lines having a positive slope portion (PS) and a negative slope portion (NS) with respect to a straight line between the two points of intersection (PX).

2. The heat exchanger according to claim 1, wherein the boundary line sections (BLS) are lines with a least a portion of the lines being curved.

3. The heat exchanger according to claim 2, wherein the (Original) boundary line sections (BLS) are lines having a portion with positive curvature and a portion with negative curvature.

4. The heat exchanger according to claim 3, wherein the boundary line sections (BLS) are lines having at least one point of inflection (PI1, PI2).

5. The heat exchanger according to claim 1, wherein the boundary line sections (BLS) are lines with a least a portion of the lines being straight.

6. The heat exchanger according to claim 1, wherein the boundary line sections (BLS) have at least one point of intersection (PX0) with the straight line between the two points of intersection (PX).

7. The heat exchanger according to claim 4, wherein the boundary line sections (BLS) are lines having only one point of inflection (PI1).

8. The heat exchanger according to claim 4, wherein the boundary line sections (BLS) are lines having only two points of inflection (PI1, PI2).

9. The heat exchanger according to claim 1, wherein within the parallel flow region (PF) the flow passages of the plurality of first flow ducts (FD1) and adjacent flow passages of the plurality of second flow ducts (FD2) are arranged in a locally or tangentially parallel relationship with respect to each other at least in a major portion of the parallel flow region.

10. The heat exchanger according to claim 1, wherein an angle of intersection (AX) at the points of intersection (PX) is comprised between 60° and 90° and its complementary angle of intersection (CAX) is comprised between 120° and 90°.

11. The heat exchanger according to claim 10, wherein the angle of intersection (AX) at the points of intersection (PX) is between 85° and 90° and its complementary angle of intersection (CAX) is between 95° and 90°.

12. The heat exchanger according to claim 11, wherein the angle of intersection (AX) and its complementary angle of intersection (CAX) at the points of intersection (PX) is 90°.

13. The heat exchanger according to claim 1, wherein a point of intersection (PX) of the plurality of points of intersection defines a corner of a flow duct (FD1, FD2) profile of the plurality of first flow ducts (FD1) and the plurality of second flow ducts (FD2).

14. The heat exchanger according to claim 1, wherein a point of intersection (PX) of the plurality of points of intersection defines a corner of four adjacent flow ducts (FD1, FD2) of the plurality of first flow ducts (FD1) and the plurality of second flow ducts (FD2).

15. The heat exchanger according to claim 1, wherein four adjacent points of intersection (PX) of the plurality of points of intersection define four corners of a flow duct (FD1, FD2) of the plurality of first flow ducts (FD1) and of the plurality of second flow ducts (FD2), and that four boundary line sections (BLS1, BLS2, BLS3, BLS4) define four wall portions of a flow duct (FD1, FD2) of the plurality of first flow ducts (FD1) and of the plurality of second flow ducts (FD2).

16. The heat exchanger according to claim 1, wherein at least two opposite wall portions (WP1, WP3 and/or WP2, WP4) have boundary line sections (BLS1, BLS3 and/or BLS2, BLS4) with identical shapes.

17. The heat exchanger according to claim 1, wherein a first pair of opposite wall portions (WP1, WP3) have boundary line sections (BLS1, BLS3) having a positive slope portion (PS) and a negative slope portion (NS) with respect to the straight line between the two points of intersection (PX) and a second pair of opposite wall portions (WP2, WP4) have straight boundary line sections (BLS2, BLS4).

18. The heat exchanger according to claim 1, wherein a first pair of opposite wall portions (WP1, WP3) have boundary line sections (BLS1, BLS3) having a positive slope portion (PS) and a negative slope portion (NS) with respect to the straight line between the two points of intersection (PX) at the beginning and at the end of each of the boundary line sections, and in that a second pair of opposite wall portions (WP2, WP4) have boundary line sections (BLS2, BLS4) having a positive slope portion (PS) and a negative slope portion (NS) with respect to a straight line between the two points of intersection (PX) at the beginning and at the end of each of the boundary line sections.

19. The heat exchanger according to claim 18, wherein a first pair of opposite wall portions (WP1, WP3) have curved boundary line sections (BLS1, BLS3) and a second pair of opposite wall portions (WP2, WP4) have straight boundary line sections (BLS2, BLS4).

20. The heat exchanger according to claim 18, wherein a first pair of opposite wall portions (WP1, WP3) have curved boundary line sections (BLS1, BLS3) and a second pair of opposite wall portions (WP2, WP4) have curved boundary line sections (BLS2, BLS4).

21. The heat exchanger according to claim 1, further comprising
a first cross flow region (CF1) where flow passages of the plurality of first flow passages (FP1) and adjacent flow passages of the plurality of second flow passages (FP2) are arranged in crosswise relationship with respect to each other, the first cross flow region (CF1) having a first opening region including open ends of the first flow passages (FP1) and having a second opening region including open ends of the second flow passages (FP2); and
a second cross flow region (CF2) where flow passages of the plurality of first flow passages (FP1) and adjacent flow passages of the plurality of second flow passages (FP2) are arranged in crosswise relationship with respect to each other, the second cross flow region (CF2) having a first opening region including the opposite open ends of the second flow passages (FP2) and having a second opening region including the opposite open ends of the first flow passages (FP1);
the first cross flow region (CF1), the parallel flow region (PF) and the second cross flow region (CF2) being arranged in series along the first flow passages (FP1) and along the second flow passages (FP2), with the parallel flow region (PF) being fluidly located between the first cross flow region (CF1) and the second cross flow region (CF2) along the first flow passages (FP1) and along the second flow passages (FP2).

22. The heat exchanger according to claim 1, wherein at least some or each of the flow ducts of the plurality of first flow ducts (FD1) and of the plurality of second flow ducts (FD2) has a constant or a varying cross-section along its entire length through the parallel flow region (PF).

* * * * *